March 25, 1952   L. A. CHASE   2,590,290
VALVE FOR FLEXIBLE HOSE
Filed Nov. 30, 1945

LEON ALLEN CHASE  INVENTOR.
BY *Martin E. Anderson*
ATTORNEY.

Patented Mar. 25, 1952

2,590,290

UNITED STATES PATENT OFFICE 2,590,290

VALVE FOR FLEXIBLE HOSE

Leon Allen Chase, Denver, Colo.

Application November 30, 1945, Serial No. 631,813

9 Claims. (Cl. 251—84)

This invention relates to improvements in valves and has reference more particularly to a specially constructed valve for use in flexible hose.

During the summer months, especially in cities, most people, as a rule, water their lawns quite frequently in order to obtain a good growth of grass and this is more particularly true in regions where the rainfall is not plentiful.

The ordinary garden hose is provided with a sprinkling nozzle, some of which are adjustable for the purpose of changing from a rather concentrated stream to a spray.

In addition to the particular type of nozzle just mentioned, there are a large variety of other nozzles some of which throw a circular spray and which make it very difficult to adjust the position of the nozzle without first turning off the water.

It is the object of this invention to produce a valve of a simple and substantial construction that can be interposed between two sections of hose at any distance from the nozzle and by means of which the water can be turned off or turned on without the necessity of operating the valve where the hose is attached to the water supply.

Another object of this invention is to produce a valve of such construction that it can be manufactured at a comparatively low cost and which can readily be positioned in the hose without the use of special tools.

A further object of the invention is to produce a valve of such construction that it will be practically leak proof and which can be conveniently operated.

The above and other objects that may appear as the description proceeds are attained by means of a construction and an arrangement of parts that will now be described in detail and for this purpose reference will be had to be accompanying drawing in which the invention has been illustrated in its preferred form, and in which.

Figure 2:
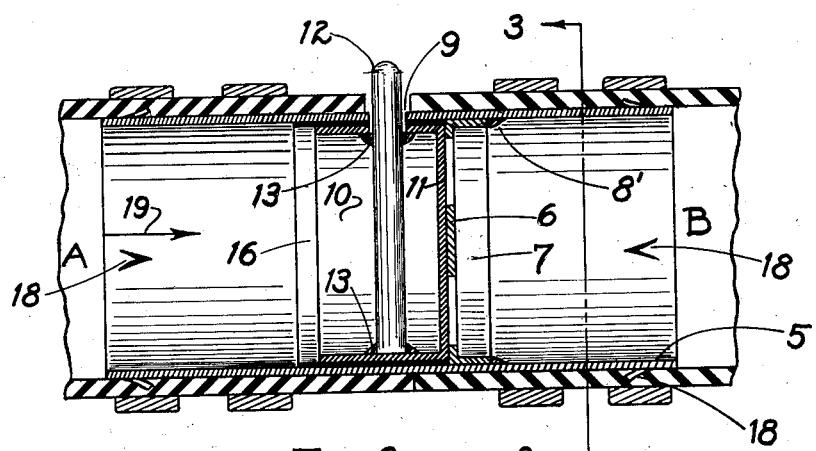
Figure 2 is a diametrical section, to an enlarged scale, taken on line 2—2, Figure 1, showing the valve construction and its relation to the hose sections.

In the drawing letters A and B indicate two hose sections that are interconnected by means of the valve which will now be described. The valve, as illustrated, consists of a tube 5 of any suitable material such as brass, copper or steel alloy and which may even be constructed of non-metallic material, such as plastic. The tube is divided into two compartments by means of a transverse diaphragm. This diaphragm has been shown as somewhat cup-shaped and provided with a cylindrical flange 7 having an outside diameter such as to form a press fit with the inner surface of the tube. The diaphragm may be soldered in position as indicated by reference numeral 8'. By properly selecting the diameter of flange 7, it is possible to position this diaphragm against movement without the use of solder or welding; however, this is a matter of shop practice and does not affect the invention.

Diaphragm 6 is provided with a plurality of openings 8 whose sides are radial. The solid material between the openings must be somewhat wider in a circumferential direction than the openings so as to form an overlap with the valve member, which will now be described.

The tubular member 5 is provided with a circumferential slot 9 having an angular extent of slightly more than 45 degrees when four openings 8 are employed. Positioned within the tubular valve member 5 is a cup-like valve member having a cylindrical portion 10 and a flat bottom 11. The bottom 11 is provided with openings 8a of the same size and shape as openings 8. In one rotary position openings 8 and 8a are brought into alignment but by rotating the cup-like valve member through an angle of 45 degrees, openings 8a will be moved to a position half way between two openings 8, thereby closing the passage between the two ends of tubular valve member 5.

Figure 1:
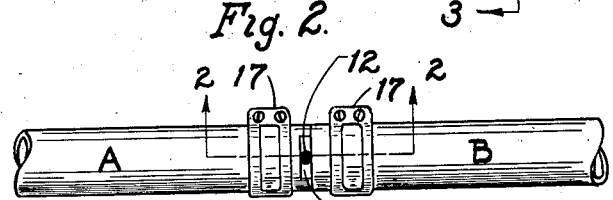
Figure 1 is a top plan view of a section of hose showing the valve in position therein.
Figure 3:
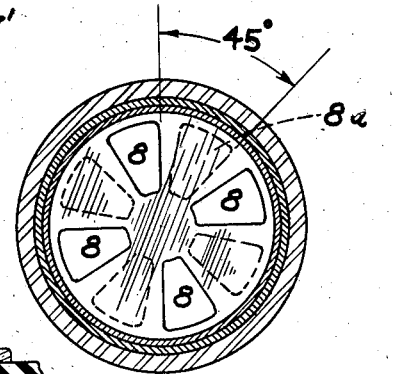
Fig. 3 is a section taken on line 3—3, Figure 2.

For the purpose of rotating the movable valve member, a handle 12 is provided. This handle may extend across the interior of the rotatable valve member, as shown in Figure 1 and may be soldered to the valve member at points 13. If this construction is adopted, the soldering will, of course, have to take place after the parts have been assembled, which can readily be done by use of a properly shaped soldering iron.

Figure 4:
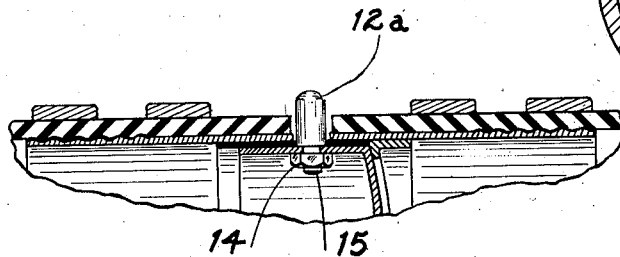
Figure 4 is a fragmentary section similar to that shown in Figure 1 and shows a slightly modified form of construction.

In Figure 4 a slightly modified construction has been shown; in this construction the handle has been designated by 12a and instead of extending across the interior of the rotatable valve member, the latter is provided on its inner surface with a nut 14 and the inner end of handle 12 is threaded as indicated at 15. The purpose of the nut is to give greater rigidity to the construction. Instead of threads, it is possible to employ solder for effecting the connection. In both of the modifications shown, the handle projects beyond the outer surface of the hose so as to be readily accessible for operation. When the parts are carefully constructed, there will be very little, if any, leakage between the inner surface of tubular valve member 5 and the outer surface of flange 10, and since the valve is employed mainly for use with lawn sprinking hose, a slight leakage is not objectionable. If a strictly leak proof valve construction is desired, a cylindrical gasket 16 can be employed and positioned between the inner surface of valve 5 and the outer surface of flange 10, as shown in the drawings. This gasket may be of leather or of any other suitable material. When the valve is to be inserted in a hose, the hose is cut on a plane perpendicular to its axis and one end is provided with a notch 17' of slightly more than 45 degrees length through which the handle extends. Suitable hose clamps 17 are employed to clamp the hose against the outer surface of valve member 5. In the drawing the outer surface of tubular member 5 has been shown as smooth. However, it may be provided with corrugations on its outer surface or tongues 18 may be cut and bent outwardly somewhat as shown in Figure 2. This provides anchors that resist relative longitudinal movement between the hose and the valve member.

When a sprinkler hose is provided with a valve of this construction, the water supply to the nozzle or sprinkler can be quickly and conveniently turned off and on whenever the sprinkler or nozzle is to be moved to another position. This is a great convenience.

Due to the simple and substantial construction of the valve, it can be manufactured at a comparatively low cost and will last indefinitely. In the drawing the diaphragm 6 has been shown as lying in a plane, but it is to be understood that if found desirable, it may be slightly spherical with the concave surface facing the water pressure. The water from the supply enters in the direction of arrow 19 and the pressure therefore serves to urge the movable valve member against partition 6 and also to urge the gasket 16 against the inner surface of valve member 5. The pressure, in the relationship to the parts above described, serves to effect a seal and makes it possible to employ a minimum number of parts and to provide a valve of sufficient tightness without extreme accuracy of construction.

Having described the invention what is claimed as new is:

1. A valve for use between two sections of garden hose or the like, comprising a tube of a diameter to fit the inside of the hose sections, a transverse partition wall rigidly secured to the inner wall surface of the tube dividing its interior into two substantially equal parts, said transverse wall having a plurality of openings arranged symmetrically about the center, the maximum dimension of the openings in a direction perpendicular to a bisecting radius of the openings being less than the corresponding distance between adjacent openings, the wall of the tube having a slot extending in a transverse plane, a cup-shaped valve member positioned in the tube, the bottom of the cup being positioned in contact with the stationary transverse wall and provided with openings positioned to be brought into register with the openings in the transverse wall in one relative rotary position, and a handle secured to the cup-shaped valve member passing through the slot into position to be engaged for turning the cup valve to bring the openings into and out of register, the construction and arrangement of parts being such that when the openings are out of register, flow of liquid through the valve is shut off completely.

2. A valve in accordance with claim 1 in which the side of the stationary transverse partition nearest the slot is spherically concave and in which the bottom surface of the cup-shaped vlave member is spherically convex to fit the concave surface of the transverse wall.

3. In combination with a circular tubular hose having ends, a combined coupling and valve device comprising, a right circular tube secured to the inner walls of the hose adjacent the respective ends joining said ends together in juxtaposed substantially abutting relation, a valve within said tube for controlling flow of fluid therethrough, and a valve actuator connected to said valve extending outwardly through the wall of the hose.

4. A device in accordance with claim 3 wherein the valve is mounted for rotary movement in a plane transverse to the tube and the actuator extends outwardly through a notch between the ends of the hose.

5. In combination with a garden hose, adapted to be connected at one end to a water faucet and at its other end to a sprinkler or the like, the combination therewith, of a circular tube secured to the inner walls of said hose securing together intermediate ends thereof in juxtaposed substantially abutting relation, a rotary valve within said tube, and a valve actuator secured to said valve extending through the wall of the hose and therebeyond a suitable distance whereby it may be actuated, the wall of the hose being substantially the same diameter at the point where the actuator extends therethrough as the remaining portions of the hose.

6. A combined coupling and valve for joining the ends of a garden hose, comprising, a right circular tube so proportioned in diameter to fit within the hose adjacent the respective ends and for joining the ends together in juxtaposed substantially abutting relation, a transverse apertured wall between the ends of the tube, a rotatable cup-shaped apertured valve member having a transverse face abutting said wall and adapted to be held thereagainst by the pressure of water applied to the opposite side from said face, the wall and cup-shaped member being constructed to completely shut off the flow of water in one position of adjustment, and an actuator connected to said cup-shaped member, extending through the wall of the tube to a position of access.

7. A garden hose comprising two flexible sections having ends of each disposed in substantially abutting relation, tubular coupling means within the hose engaging the inner walls of the sections adjacent each end thereof for retaining the sections together in the position aforesaid, valve means within the coupling means for permitting flow of water therethrough and for completely shutting off the flow, and a valve actuator connected to the valve means having a portion extending to a point outwardly of the hose to a position where it may be actuated to control the flow of water through the hose.

8. Apparatus in accordance with claim 7 wherein the valve means is mounted for rotation about the longitudinal axis of the hose and the actuator is rotatable in a plane perpendicular to said axis.

9. A garden hose comprising two flexible sections having ends disposed adjacent each other in substantially abutting relation to form a smooth substantially continuous hose of substantially uniform diameter, hollow coupling means within the hose extending into each section, valve means within the coupling means for controlling flow of water through the sections, and actuator means extending between said ends to a position outside of the hose, the actuator means being connected to the valve means for operating same.

LEON ALLEN CHASE.

REFERENCES CITED

The following references are of record in the file of this patent:

UNITED STATES PATENTS

| Number | Name | Date |
|---|---|---|
| 607,669 | Underwood | July 19, 1898 |
| 624,422 | Baird | May 2, 1899 |
| 1,266,422 | De Mers | May 14, 1918 |
| 1,852,123 | Lutsky | Apr. 5, 1932 |
| 2,210,559 | Albright | Aug. 6, 1940 |
| 2,401,782 | Weller | June 11, 1946 |